United States Patent [19]

Mabuchi et al.

[11] Patent Number: 4,627,638
[45] Date of Patent: Dec. 9, 1986

[54] SHOCK ABSORBING MATERIAL

[75] Inventors: Akira Mabuchi; Sadao Uchida; Masanao Ishikake, all of Aichi, Japan

[73] Assignee: Toyoda Gosei Co., Ltd., Nishikasugai, Japan

[21] Appl. No.: 712,254

[22] Filed: Mar. 15, 1985

[30] Foreign Application Priority Data

Mar. 15, 1984 [JP] Japan .................. 59-50632

[51] Int. Cl.$^4$ .............................................. B62D 1/16
[52] U.S. Cl. ........................ 280/779; 280/89; 280/751
[58] Field of Search .............. 280/750, 751, 89, 779, 280/780; 267/136, 139, 2; 428/116; 264/41, 45.3, 45.5

[56] References Cited

U.S. PATENT DOCUMENTS

| | | | |
|---|---|---|---|
| 3,644,168 | 2/1972 | Bonk et al. | 428/258 |
| 3,934,897 | 1/1976 | Moos | 280/750 |
| 4,015,861 | 4/1977 | Finch | 280/750 |
| 4,365,826 | 12/1982 | Iriyama | 280/779 |
| 4,383,704 | 5/1983 | Yoshitsugu | 280/750 |
| 4,406,176 | 9/1983 | Numazawa et al. | 280/779 |
| 4,452,096 | 6/1984 | Workman | 280/779 |

FOREIGN PATENT DOCUMENTS 2312843 9/1974 Fed. Rep. of Germany.
2529920 1/1977 Fed. Rep. of Germany.

Primary Examiner—Richard A. Bertsch
Attorney, Agent, or Firm—Cushman, Darby & Cushman

[57] ABSTRACT

A shock absorbing material suited for use in automobile steering wheel comprises a core portion and a skin layer integrally formed on the core portion by foaming. The core portion and the skin layer are formed of isocyanurate ring-containing foam obtained by reacting polyhydroxy compounds having a hydroxyl value of 200 to 700, triethanolamine and polymethylene having a mean functional group number of 2.3 to 3.5 in an equivalent ratio of NCO/OH=2.5 to 5 in the presence of foaming agents and trimerization catalysts followed by foaming. It is important that the density of the skin layer is higher than that of the core portion. When the driver beats against the steering wheel in car accidents, the shock absorbing materials are deformed by absorbing impact force, thereby protecting the driver.

2 Claims, 9 Drawing Figures

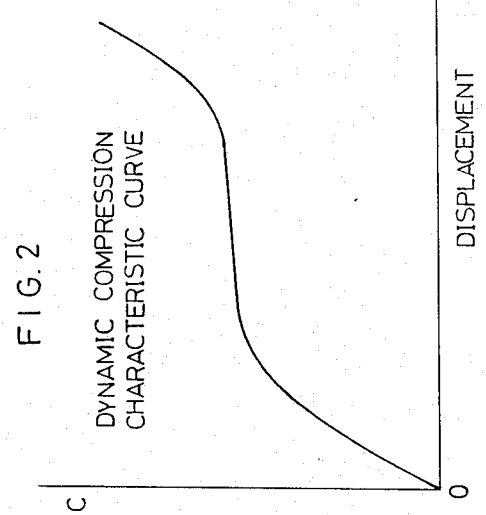
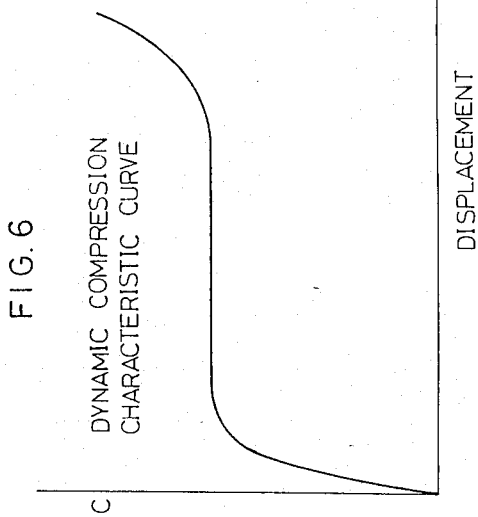
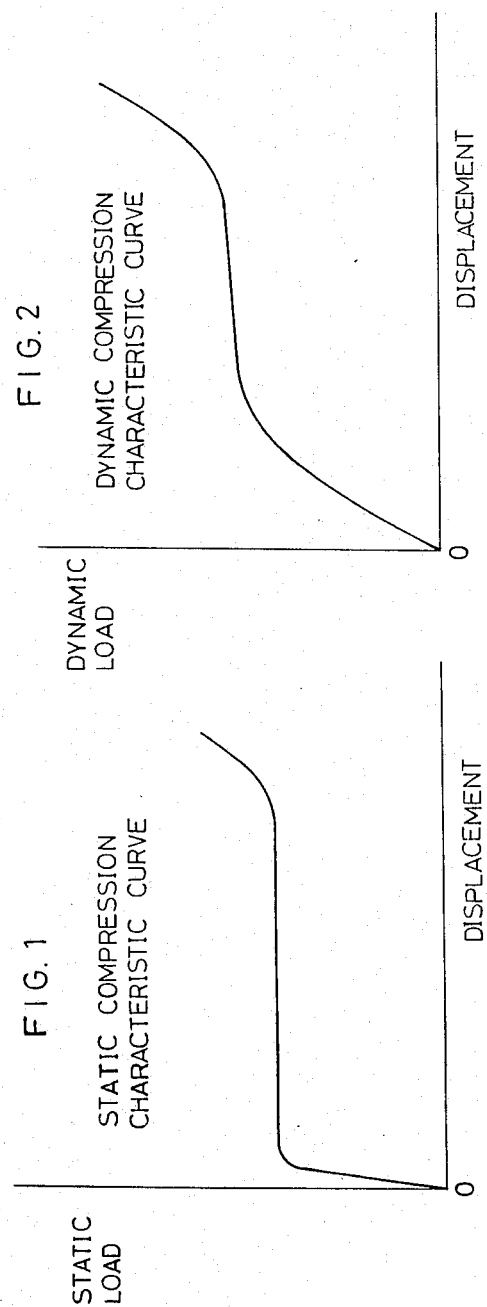
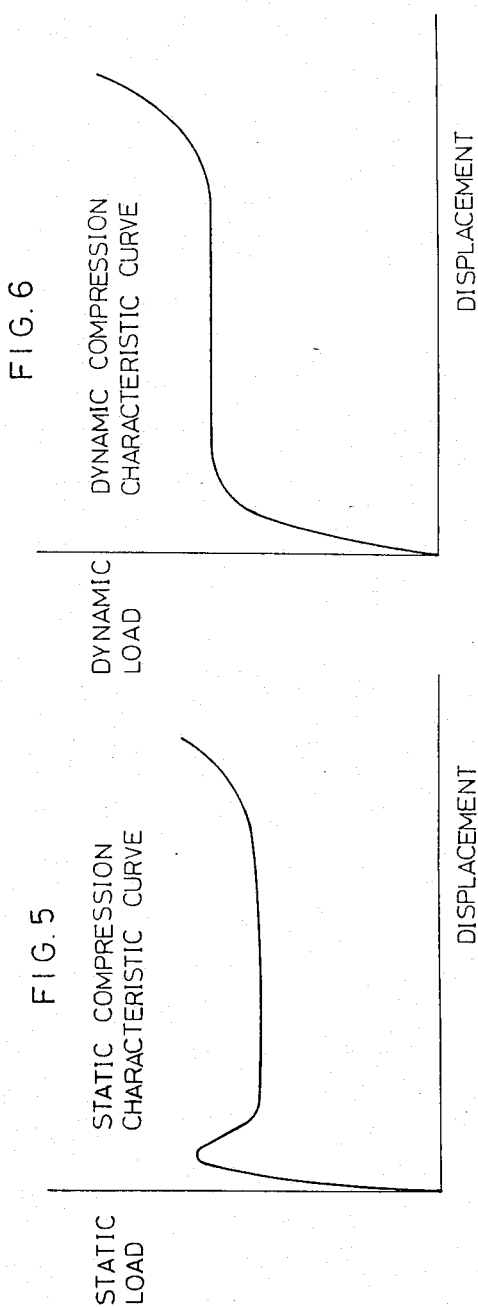

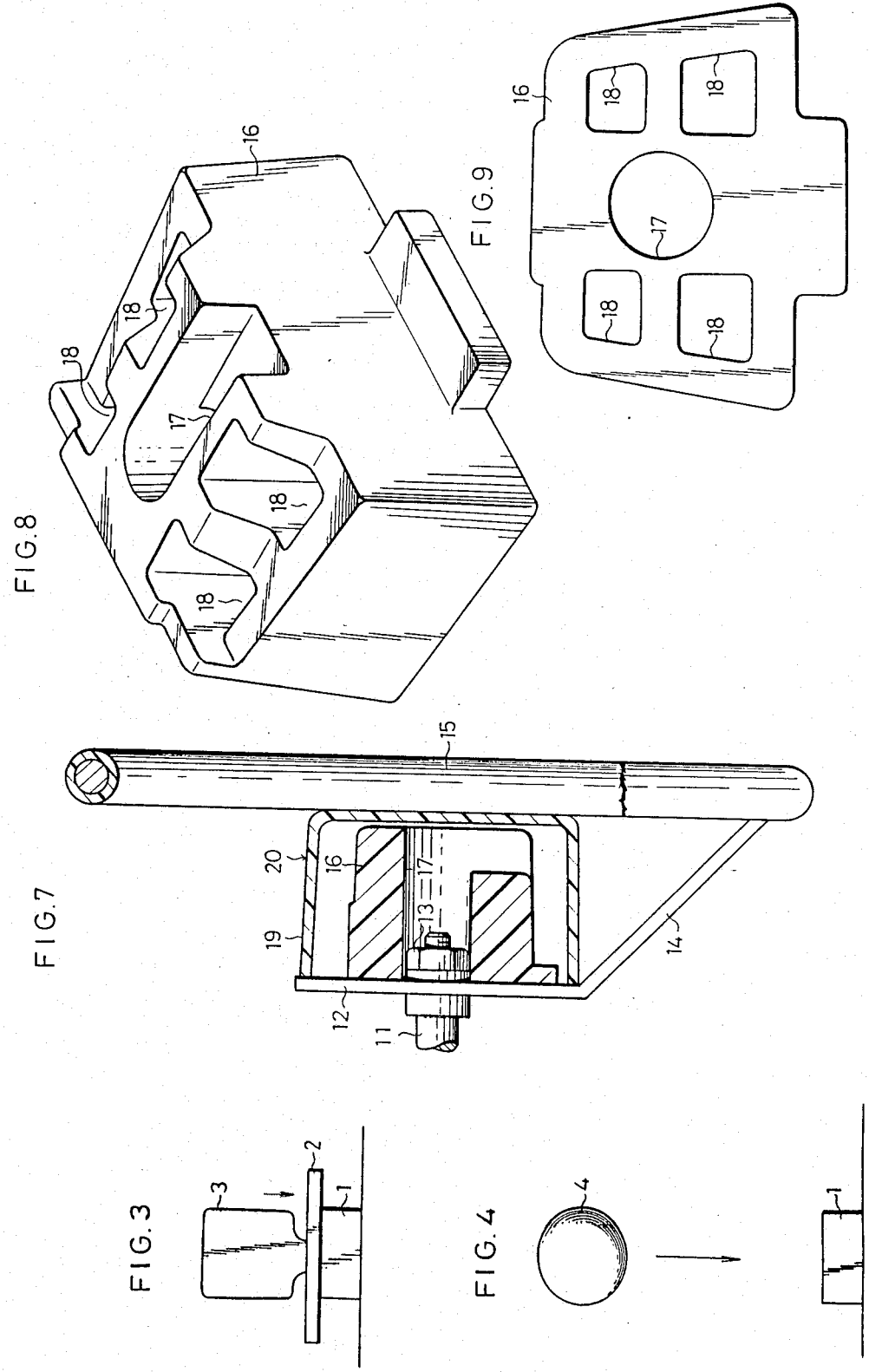

SHOCK ABSORBING MATERIAL

BACKGROUND OF THE INVENTION

1. Field of the Invention

The present invention relates to shock absorbing materials which are excellent in dynamic compression characteristic.

2. Description of the Prior Art

The evaluation of the compression characteristic of shock absorbing materials has heretofore been evaluated conventionally by a static compression test. On the static compression characteristic, for example, a static compression characteristic curve as shown in FIG. 1 is believed to be ideal in view of an efficiency of energy absorption.

However, even if a shock absorbing material has an ideal static compression characteristic as shown in FIG. 1, when the shock absorbing material is tested as to its dynamic compression, the dynamic compression characteristic curve is formed as shown in FIG. 2 in which the leading edge of the load is dull and accordingly, a disadvantage is encountered that the efficiency of energy absorption is poor.

In FIG. 1, the axis of abscissa denotes a displacement, and the axis of ordinate denotes a static load applied to the shock absorbing material. In FIG. 2, the axis of abscissa denotes a displacement, and the axis of ordinate denotes a dynamic load applied to the shock absorbing material.

SUMMARY OF THE INVENTION

It is an object of the present invention to provide a shock absorbing material which is excellent in dynamic compression characteristic as well as in static compression characteristic.

Other objects of the present invention will become apparent upon reference to the following embodiments of the present invention. Many advantages which are not mentioned in the specification will occur to one skilled in the art when he practices the present invention.

BRIEF DESCRIPTION OF THE DRAWINGS

FIG. 1 is a view showing a static compression characteristic of a conventional shock absorbing material;

FIG. 2 is a view showing a dynamic compression characteristic of the conventional shock absorbing material;

FIG. 3 is a front view of static compression test;

FIG. 4 is a front view of dynamic compression test;

FIG. 5 is a view showing a static compression characteristic of a shock absorbing material in accordance with an embodiment of the present invention;

FIG. 6 is a view showing a dynamic compression characteristic of the present shock absorbing material;

FIG. 7 is a sectional view of a steering device to which the present shock absorbing material is applied;

FIG. 8 is a perspective view of the present shock absorbing material;

FIG. 9 is a bottom view of the present shock absorbing material.

DETAILED DESCRIPTION OF THE PREFERRED EMBODIMENTS

First, an embodiment of the present invention will be outlined below.

Polymers which are used in the shock absorbing material are obtained by reacting polyhydroxy compounds having a hydroxyl value of 200 to 700, triethanolamine and polymethylene polyphenyl isocyanate having a mean functional group number of 2.3 to 3.5 in an equivalent ratio of NCO/OH=2.5 to 5 in the presence of a foaming agent and a trimerization catalyst, charging the reaction product into a mold and then foaming, an isocyanurate ring-containing foam thus being obtained.

A portion of the material which contacts with the die upon molding is cooled by the die so that the foaming of that portion thereof is suppressed to form a skin layer of high density. The core portion which is covered by the skin layer is vigorously foamed, and thus is provided with low density.

The density of the shock absorbing material at the core portion which is obtained at this stage is 0.02 to 0.1 $g/cm^3$ and, the density of the skin layer integrally formed around the circumference of the core portion is 0.1 to 1.0 $g/cm^3$.

In the present invention, the density of the skin layer refers to an average density of the layer from the surface to a thickness of 2 mm.

In the shock absorbing material constructed as mentioned above, the density of the skin layer formed at the surface is higher than that of the core portion. For this reason, it is believed that the present shock absorbing material would have dynamic and static compression characteristics different from those of the conventional shock absorbing material.

The shock absorbing material consisting of the aforesaid isocyanurate ring-containing foam was subjected to the static and dynamic compression tests.

The isocyanurate ring-containing foam used in both tests were molded as follows.

Sucrose type polyol SC-800 (made by Asahi Denka Kogyo Kabushiki Kaisha) having a hydroxyl value of 560, 100 parts by weight, as a polyhydroxy compound, 2.5 parts by weight of triethanolamine as a cross-linking agent, 1 part by weight of L-5420 (made by Nippon Unicar Co., Ltd.) as a foam regulator, 5 parts by weight of SA-NO 1, 5 parts by weight of SA-106 and 5 parts by weight of Polycat 41 as trimerization catalysts (these catalysts were all manufactured by San-Abbott Ltd.) and 150 parts by weight of Fleon R11 as a foaming agent were mixed. To the mixture were added 600 parts by weight of Milionate MR-100 (in an equivalent ratio of NCO/OH=423/100 made by Nippon Polyurethane Industry Co., Ltd.) as a polymethylene polyphenyl isocyanate. The resulting mixture was vigorously mixed with a stirrer and then charged into a mold having an inner size of 90×90×55 mm, which had been kept at 45° to 50° C. After the system was maintained for 5 minutes in this state, it was settled at room temperature for 24 hours.

The density of the core portion of the shock absorbing material obtained at this stage was 0.04 $g/cm^3$ and that of the skin layer was 0.2 $g/cm^3$.

In the static compression test, plate 2 was put on a test piece 1 of 90×90×50 mm and then weight 3 was applied thereto at a compression speed of 30 mm/min., as shown in FIG. 3, and the load and the displacement value when the load was applied were measured.

In the dynamic compression test which was performed by a drop-type test, weight 4 having a diameter of 160 mm and a mass of 6.8 kg was dropped on the test piece 1 from the upper position with a vertical distance of 2.5 m therebetween, where the impact load and the displacement value when the load was applied were measured.

Results of the above static and dynamic tests are shown in FIGS. 5 and 6.

It is understood from FIG. 5 that the static compression characteristic curve appearing in the static compression test has a leading edge peak, and is thus clearly different from the terrace-shaped static compression characteristic curve of the conventional shock absorbing material. Accordingly, it is understood that the present shock absorbing material has a high energy absorbing efficiency. Further, it is understood from FIG. 6 that the dynamic compression characteristic curve appearing in the dynamic compression test has a sharp rising gradient and accordingly, it has a high energy absorbing efficiency.

From these results, it is understood that the dynamic compression characteristic is improved by increasing the density of the skin layer to a higher level than that of the core portion in the shock absorbing material.

Referring to FIGS. 7 through 9, an example where the present shock absorbing material is used as a pad in a steering wheel for an automobile will be described.

Steering shaft 11 extends through a steering column (not shown) for an automobile and has boss plate 12 which is fixed on one end of the steering shaft by nut 13. Ring 15, for steering operation, is supported by the boss plate 12 through one or a plurality of spokes 14.

A cubic shock absorbing body 16 formed using isocyanurate ring-containing foam as a shock absorbing material is fixed on the surface of boss plate 12. As shown in FIG. 8 the, shock absorbing body 16 has vertically extending through-hole 17 for receiving nut 13 at its central portion and, two pairs of vertically extending left and right through-holes 18 are provided on both sides of the through-hole 17, which hole 17 and holes 18 are formed when shock absorbing body 16 is die-molded.

Further a cap-shaped pad member 19 made of a flexible synthetic resin is mounted on boss plate 12 to cover shock absorbing body 16. Shock absorbing body 16 and pad member 19 constitute pad 20.

According to the thus constructed pad 20 of the steering wheel as described above, for example, when the driver beats his or her head against the pad 20 in an accident, etc., shock absorbing body 16 is deformed through pad member 19 to absorb a substantial impact force, thereby protecting the driver.

In the embodiment of the present invention, a plurality of holes is provided in shock absorbing body 16 so that the entire surface area, namely, the entire skin layer of shock absorbing body 16 is larger than that of the body made of the same material but having no holes. Therefore, the static compression characteristic and the present shock absorbing body can be improved as compared to those of the body made of the same material but having no holes 17 and 18.

Although through-holes 17 and 18 are provided in the shock absorbing body 16, the holes can be substituted by grooves or concaves to increase the surface area, i.e., the skin layer of shock absorbing body 16.

It is evident that the present invention can be constructed over a wide variety of different embodiments without departing from the spirit and scope of the invention and therefore, the invention is not deemed to be limited to the specific embodiments except for the attached claims.

What is claimed is:

1. A pad for an automobile steering assembly provided with a shock absorbing body composed of:
    (a) a core portion having a density of 0.02 to 0.1 g/cm$^3$, said core portion being formed of an isocyanurate ring-containing foam, said isocyanurate ring-containing foam being a product obtained by reacting a polyhydroxy compound having a hydroxyl value of 200 to 700, triethanolamine and a polymethylene polyphenyl isocyanate having a mean functional group number of 2.3 to 3.5 in an equivalent value of NCO/OH=2.5 to 5 in the presence of a foaming agent and a trimerization catalyst, and
    (b) a skin layer integrally formed on said core portion by foaming, said skin layer having a higher density than that of said core portion which is 0.1 to 1.0 g/cm$^3$ and being formed of an isocyanurate ring-containing foam, said isocyanurate ring-containing foam being a product obtained by reacting a polyhydroxy compound having a hydroxyl value of 200 to 700, triethanolamine and a polymethylene polyphenyl isocyanate having a mean functional group number of 2.3 to 3.5 in an equivalent value of NCO/OH=2.5 to 5 in the presence of a foaming agent and a trimerization catalyst.

2. The pad of claim 1, wherein:
said shock absorbing body is provided in the form of a block having a plurality of laterally-spaced, axially extending openings provided therethrough.

* * * * *